No. 824,207. PATENTED JUNE 26, 1906.
C. G. RICHARDSON.
LATHE.
APPLICATION FILED MAR. 14, 1903.
14 SHEETS—SHEET 4.

WITNESSES:
Gustave Dieterich.
Edwin H. Dietrich.

INVENTOR
Charles G. Richardson
BY
ATTORNEY

No. 824,207. PATENTED JUNE 26, 1906.
C. G. RICHARDSON.
LATHE.
APPLICATION FILED MAR. 14, 1903.
14 SHEETS—SHEET 5.
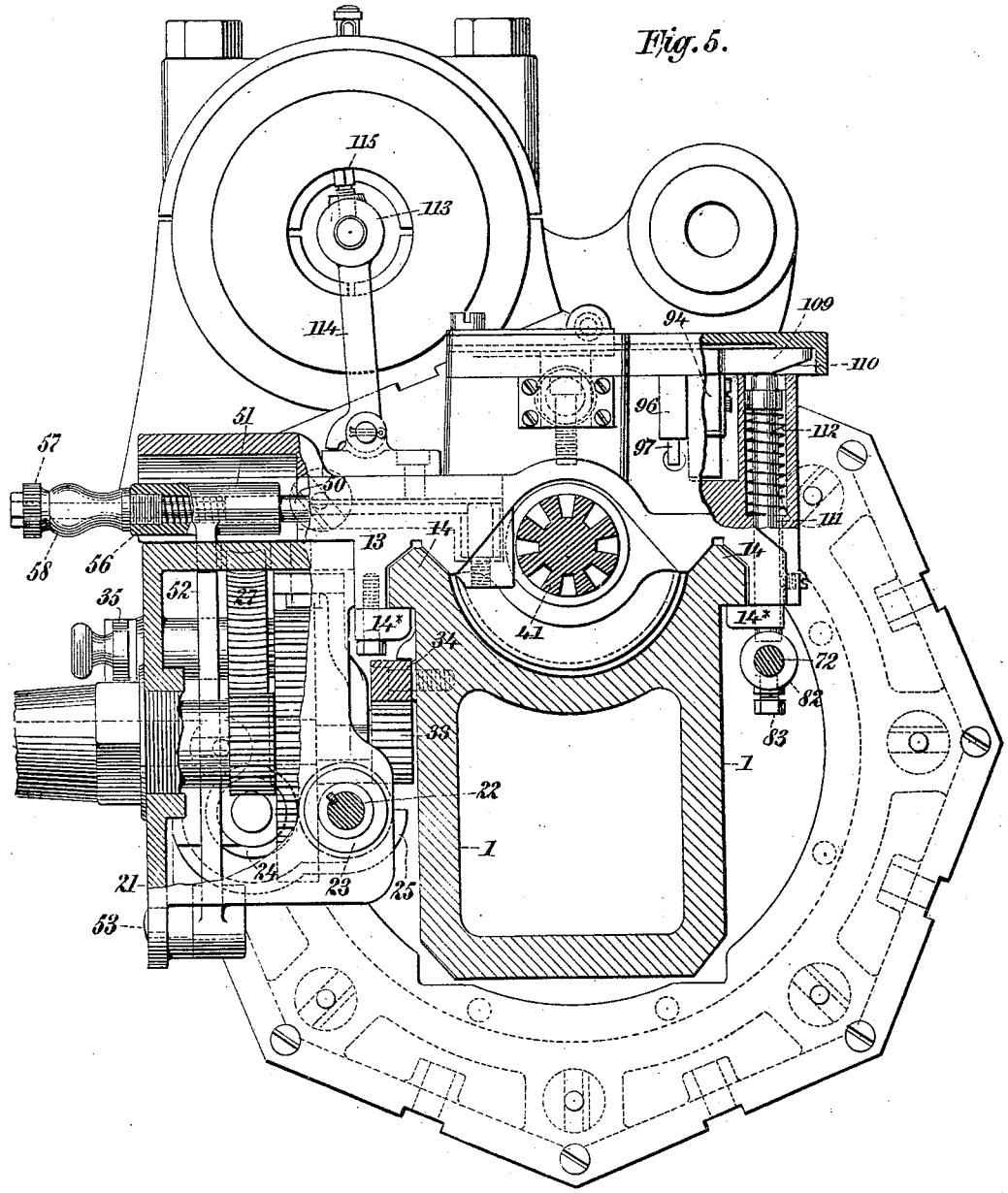
Fig. 5.
Fig. 28.
WITNESSES:
Gustave Dieterich
Edwin H. Dieterich
INVENTOR
Charles G. Richardson
BY
his ATTORNEY

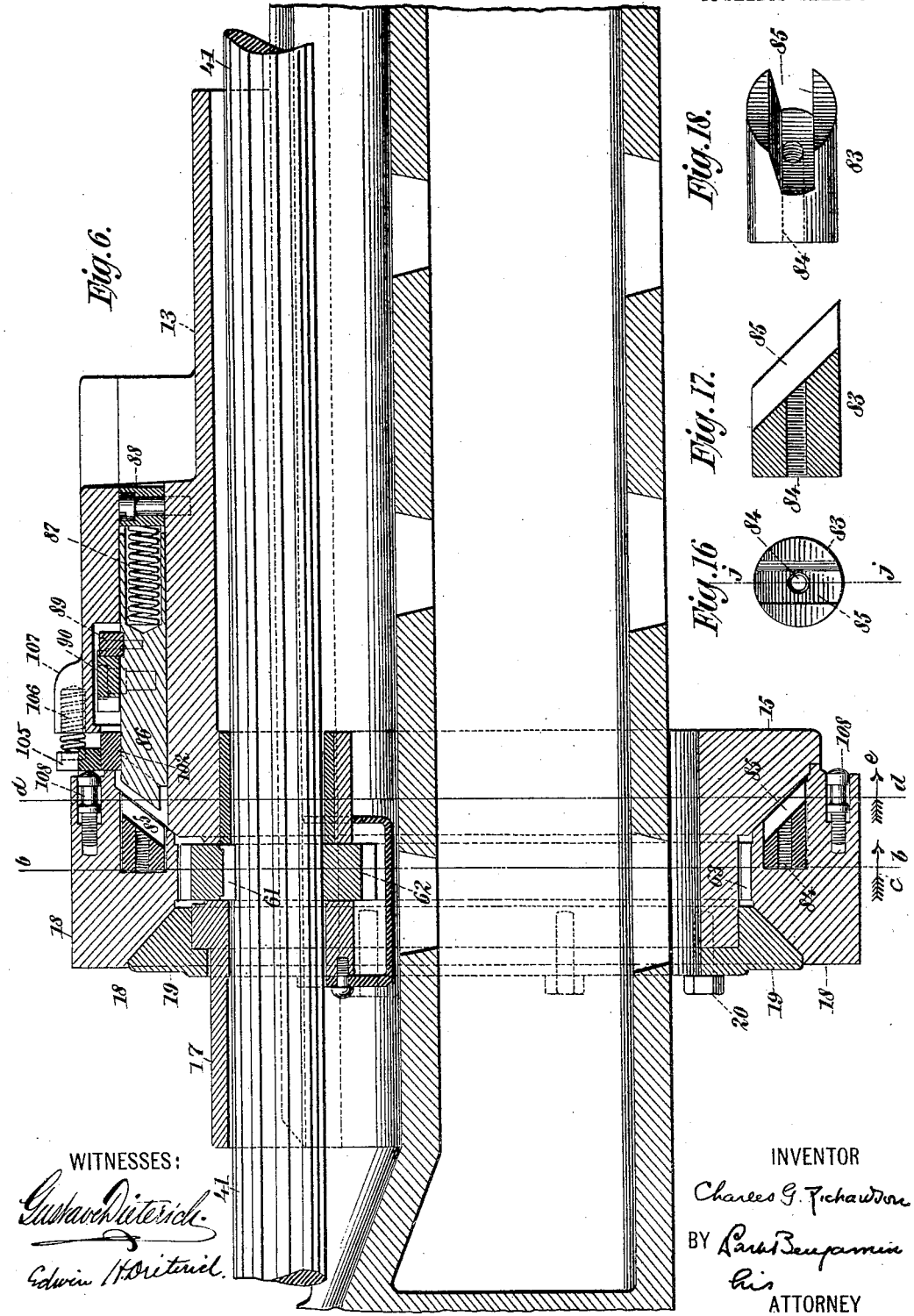

No. 824,207.  
PATENTED JUNE 26, 1906.  
C. G. RICHARDSON.  
LATHE.  
APPLICATION FILED MAR. 14, 1903.  
14 SHEETS—SHEET 7.
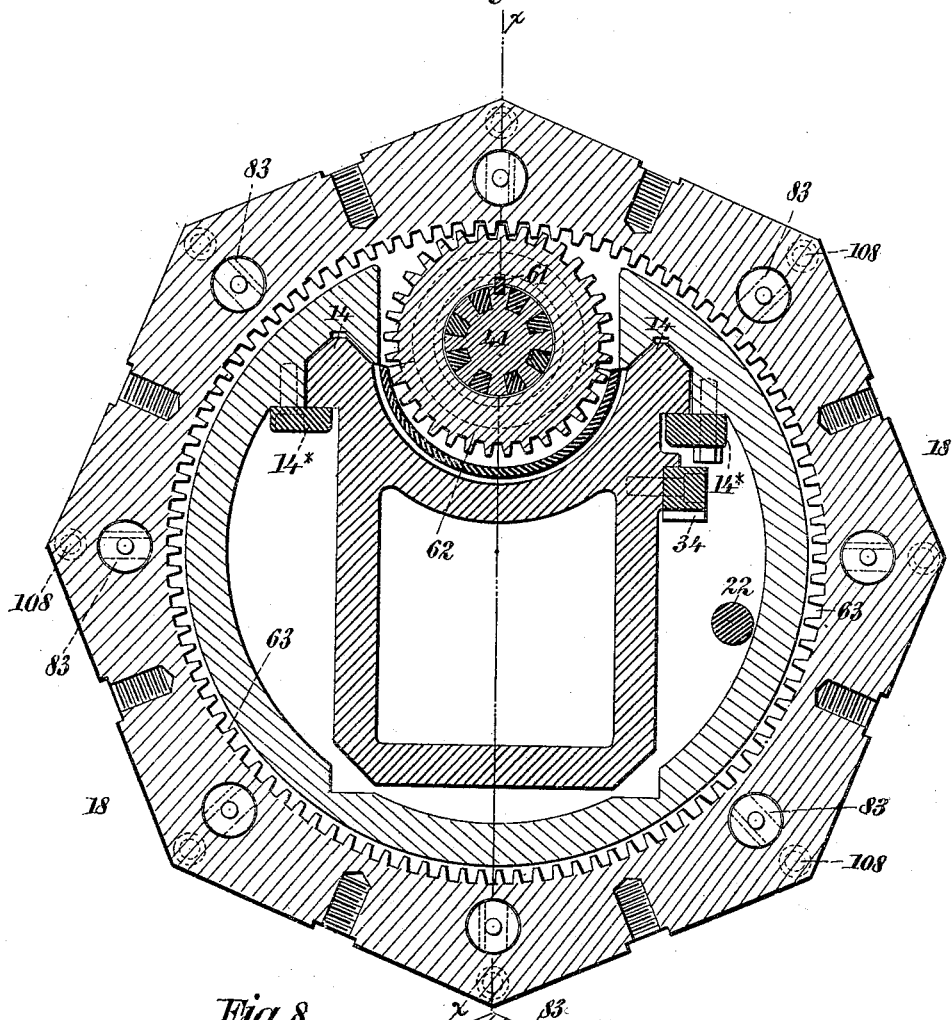
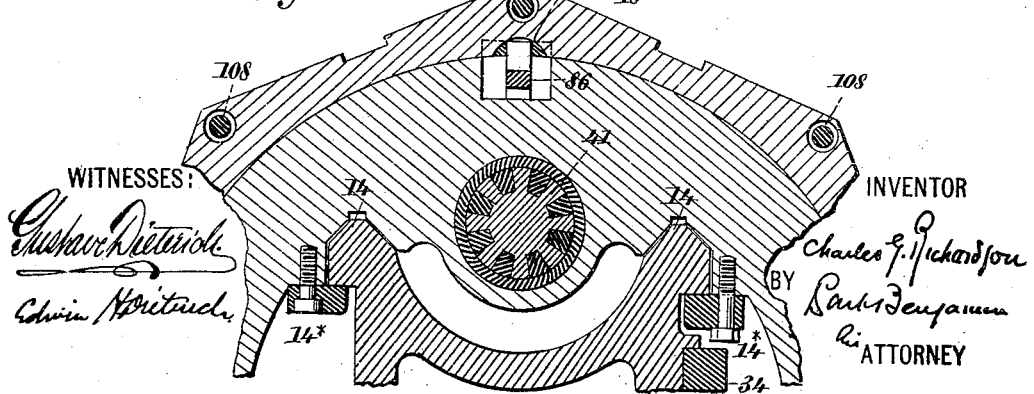

No. 824,207. PATENTED JUNE 26, 1906.
C. G. RICHARDSON.
LATHE.
APPLICATION FILED MAR. 14, 1903.
14 SHEETS—SHEET 8.
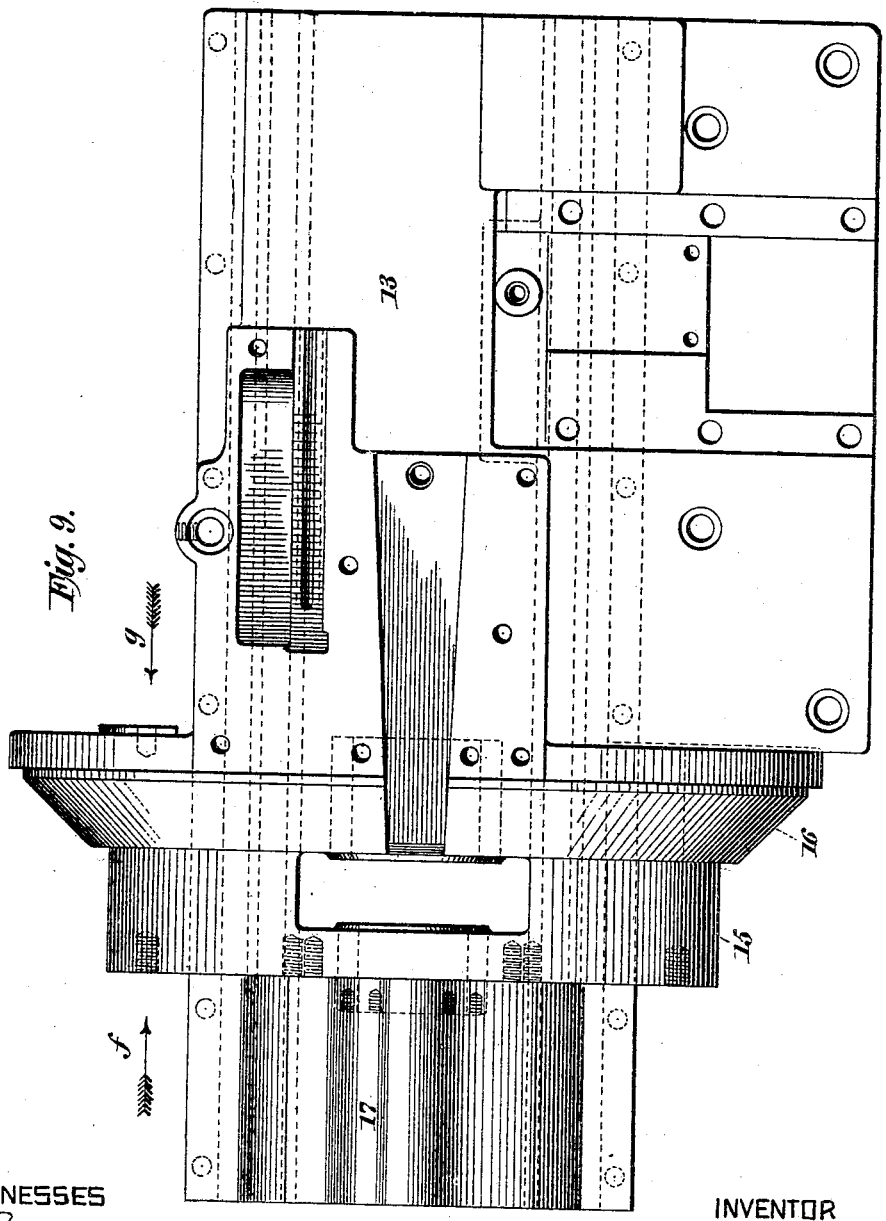
WITNESSES
INVENTOR
Charles G. Richardson
BY
ATTORNEY No. 824,207. PATENTED JUNE 26, 1906.
C. G. RICHARDSON.
LATHE.
APPLICATION FILED MAR. 14, 1903.
14 SHEETS—SHEET 9.
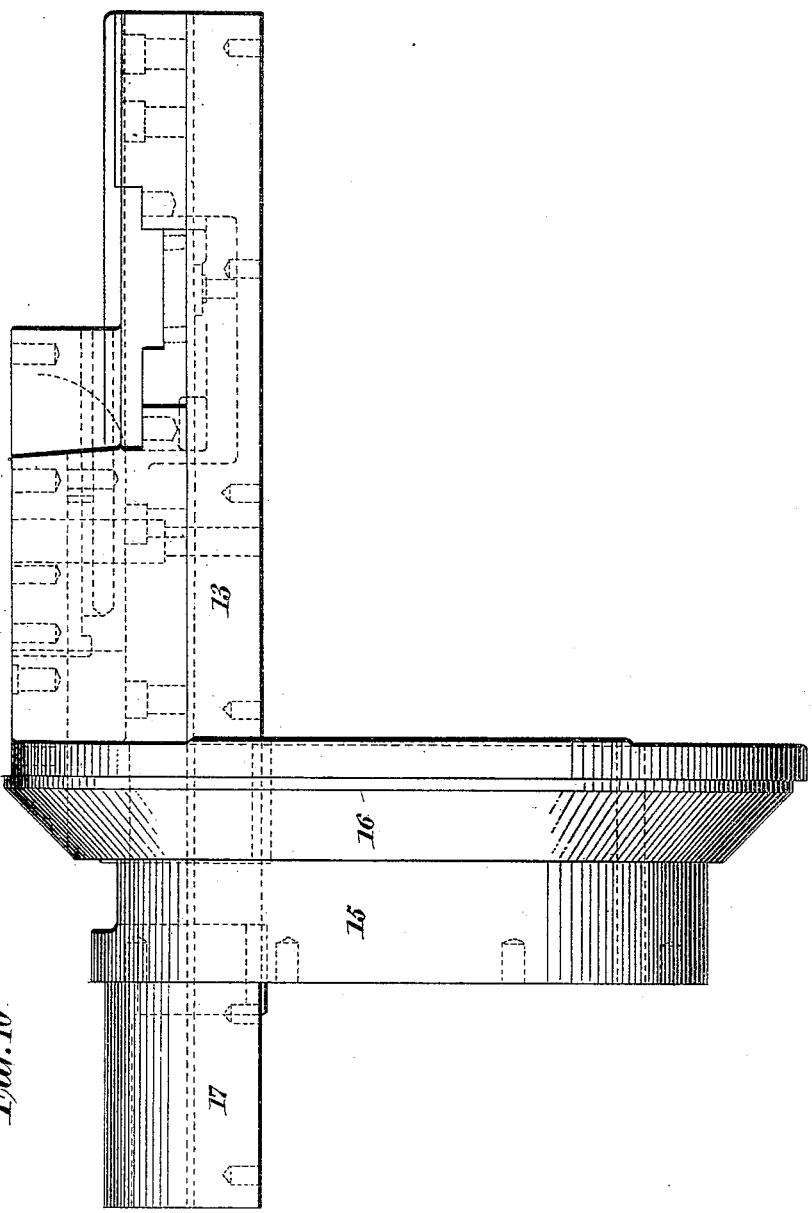
WITNESSES:
INVENTOR
Charles G. Richardson
BY
ATTORNEY

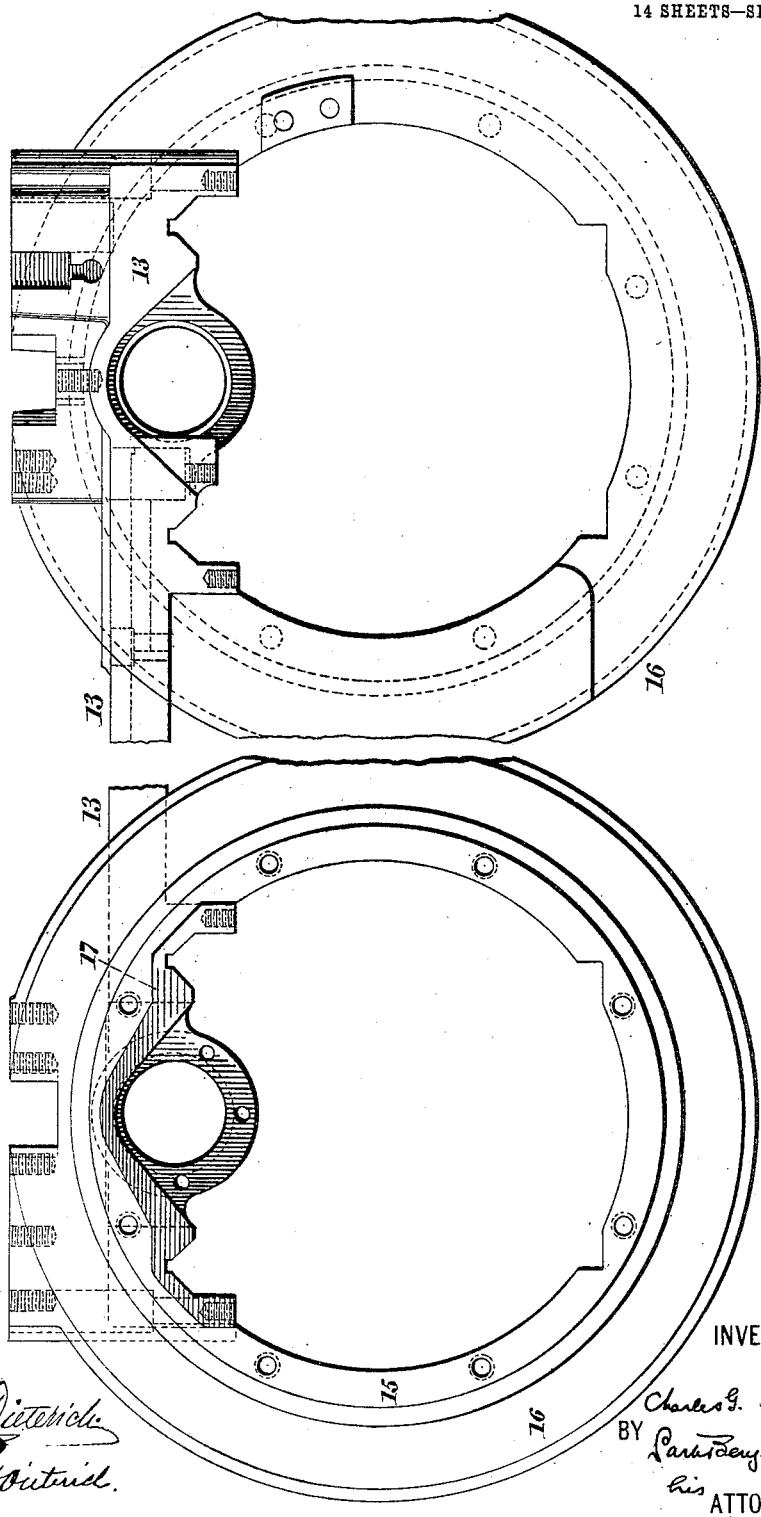

No. 824,207. PATENTED JUNE 26, 1906.
C. G. RICHARDSON.
LATHE.
APPLICATION FILED MAR. 14, 1903.
14 SHEETS—SHEET 11.
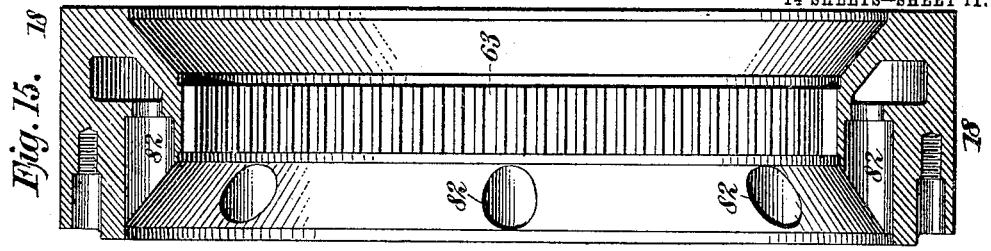
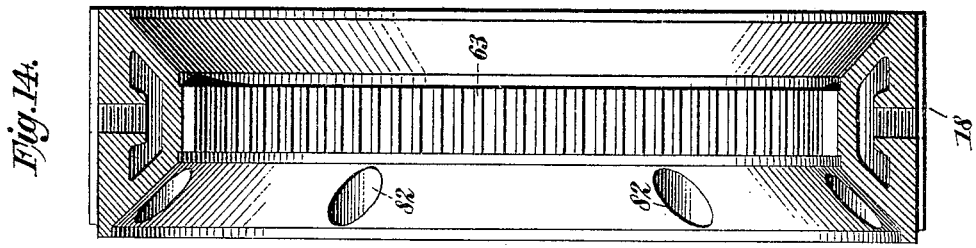
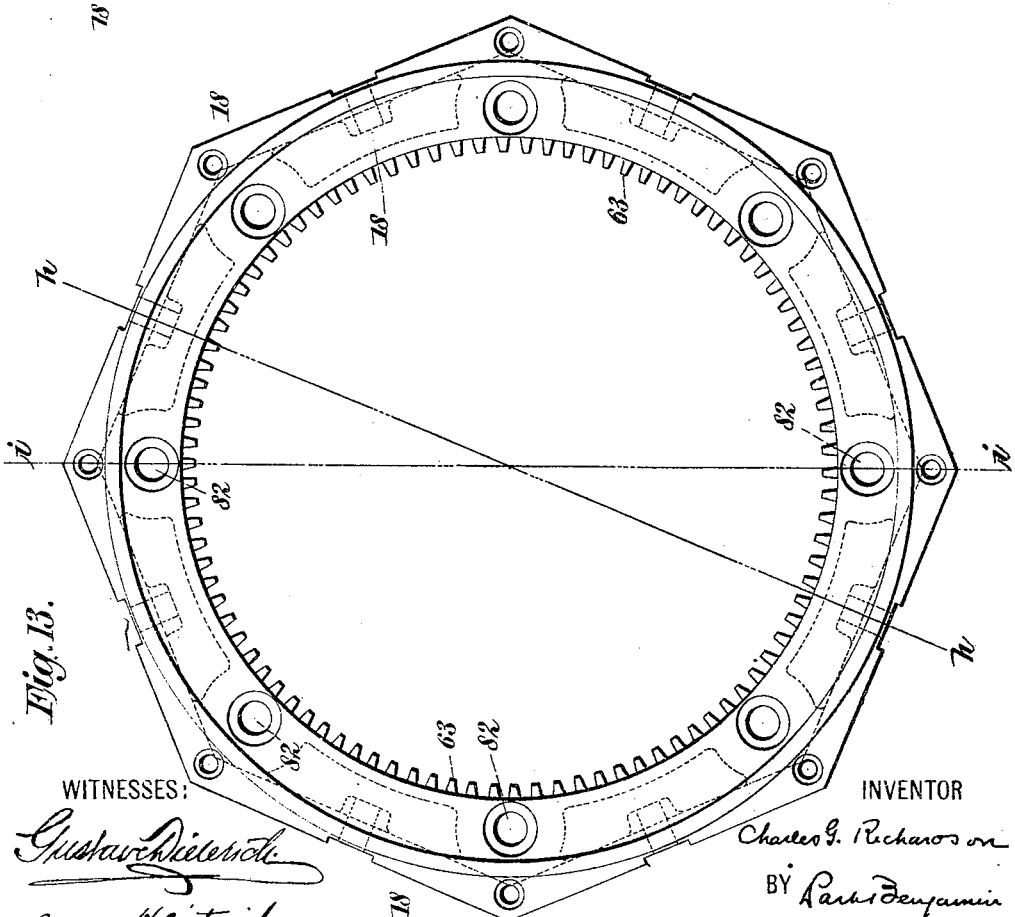
WITNESSES:
Gustav Dietrich
Edwin Houterich
INVENTOR
Charles G. Richardson
BY Parks Benjamin
his ATTORNEY No. 824,207. PATENTED JUNE 26, 1906.
C. G. RICHARDSON.
LATHE.
APPLICATION FILED MAR. 14, 1903.
14 SHEETS—SHEET 12.
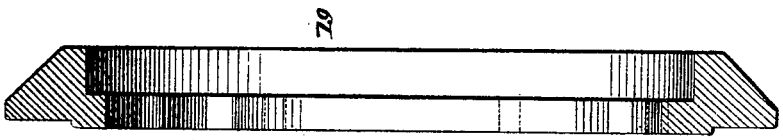
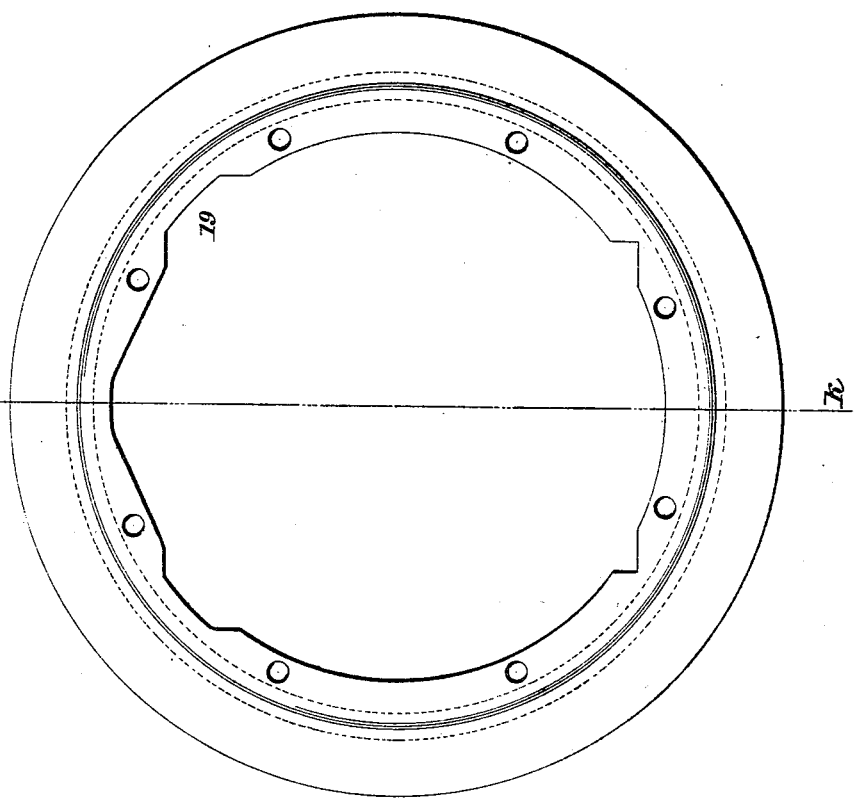
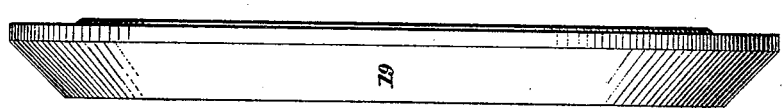
WITNESSES:
INVENTOR
Charles G. Richardson
BY
ATTORNEY No. 824,207. PATENTED JUNE 26, 1906.
C. G. RICHARDSON.
LATHE.
APPLICATION FILED MAR. 14, 1903.
14 SHEETS—SHEET 13.
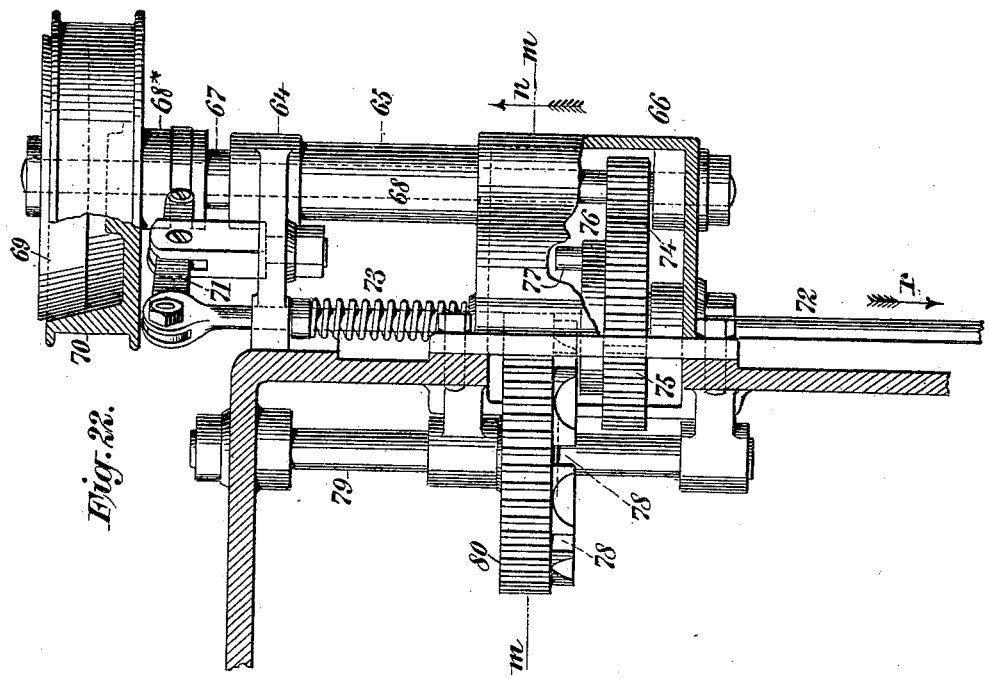
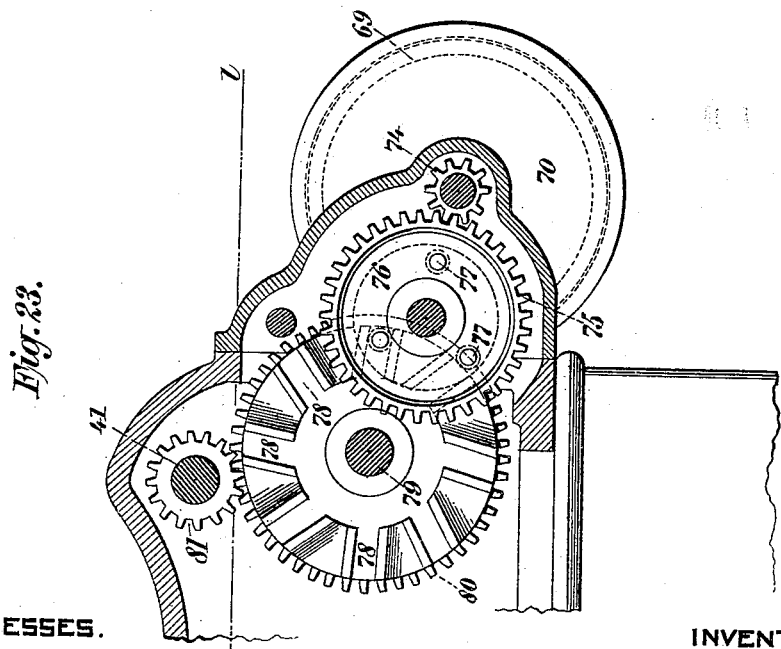
WITNESSES.
Gustave Dieterich.
Edwin H. Dieterich.
INVENTOR
Charles G. Richardson
BY Park Benjamin
his ATTORNEY.

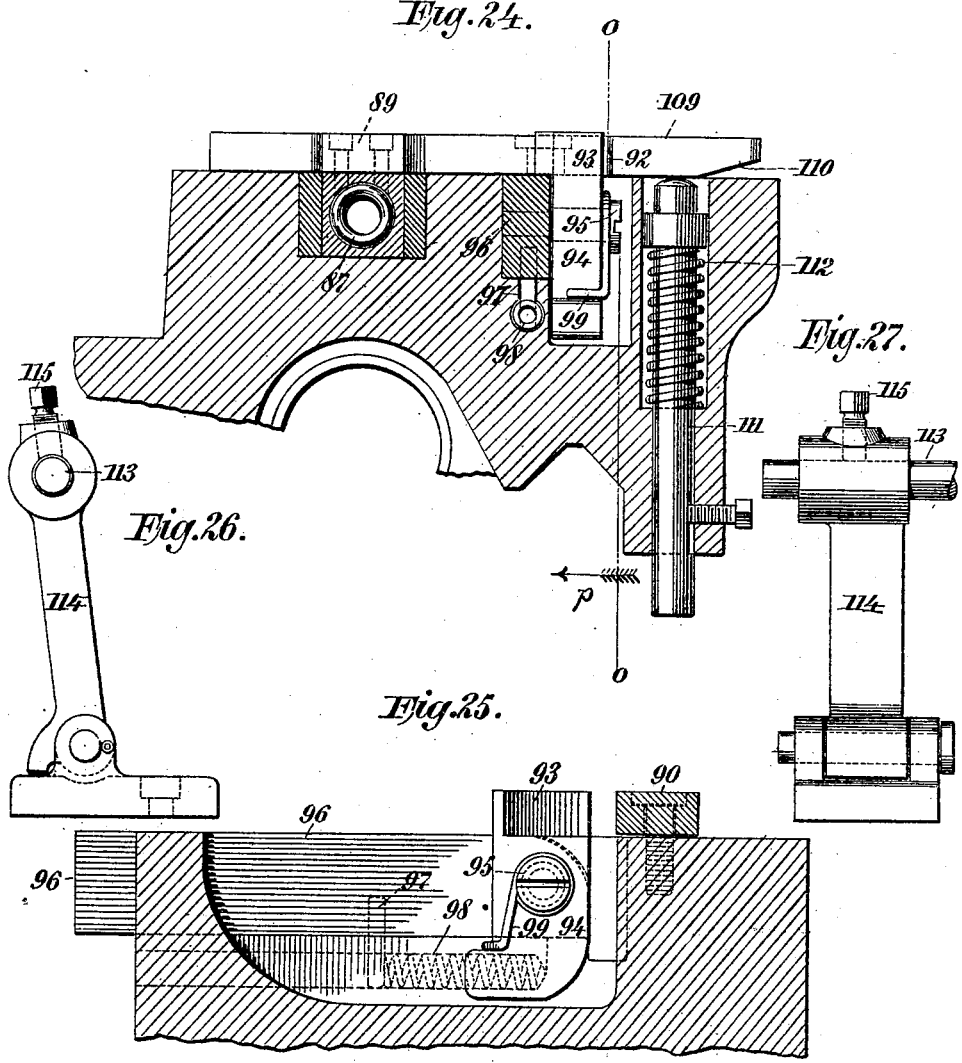

UNITED STATES PATENT OFFICE.

CHARLES G. RICHARDSON, OF SPRINGFIELD, VERMONT, ASSIGNOR, BY MESNE ASSIGNMENTS, TO MASSEY MACHINE COMPANY, A CORPORATION OF NEW YORK.

LATHE.

No. 824,207.  Specification of Letters Patent.  Patented June 26, 1906.

Application filed March 14, 1903. Serial No. 147,826.

*To all whom it may concern:*

Be it known that I, CHARLES G. RICHARDSON, of Springfield, Vermont, have invented a new and useful Improvement in Lathes, of which the following is a specification.

The invention relates to turret-lathes, and more particularly to a turret-lathe of the type and general construction illustrated in United States Letters Patent No. 481,717, granted to me August 30, 1892.

The invention consists more particularly in the devices for rotating and arresting the turret, also for bringing into operative position the several feed-stops, also the various combinations and instrumentalities more particularly pointed out in the claims.

Figure 1:
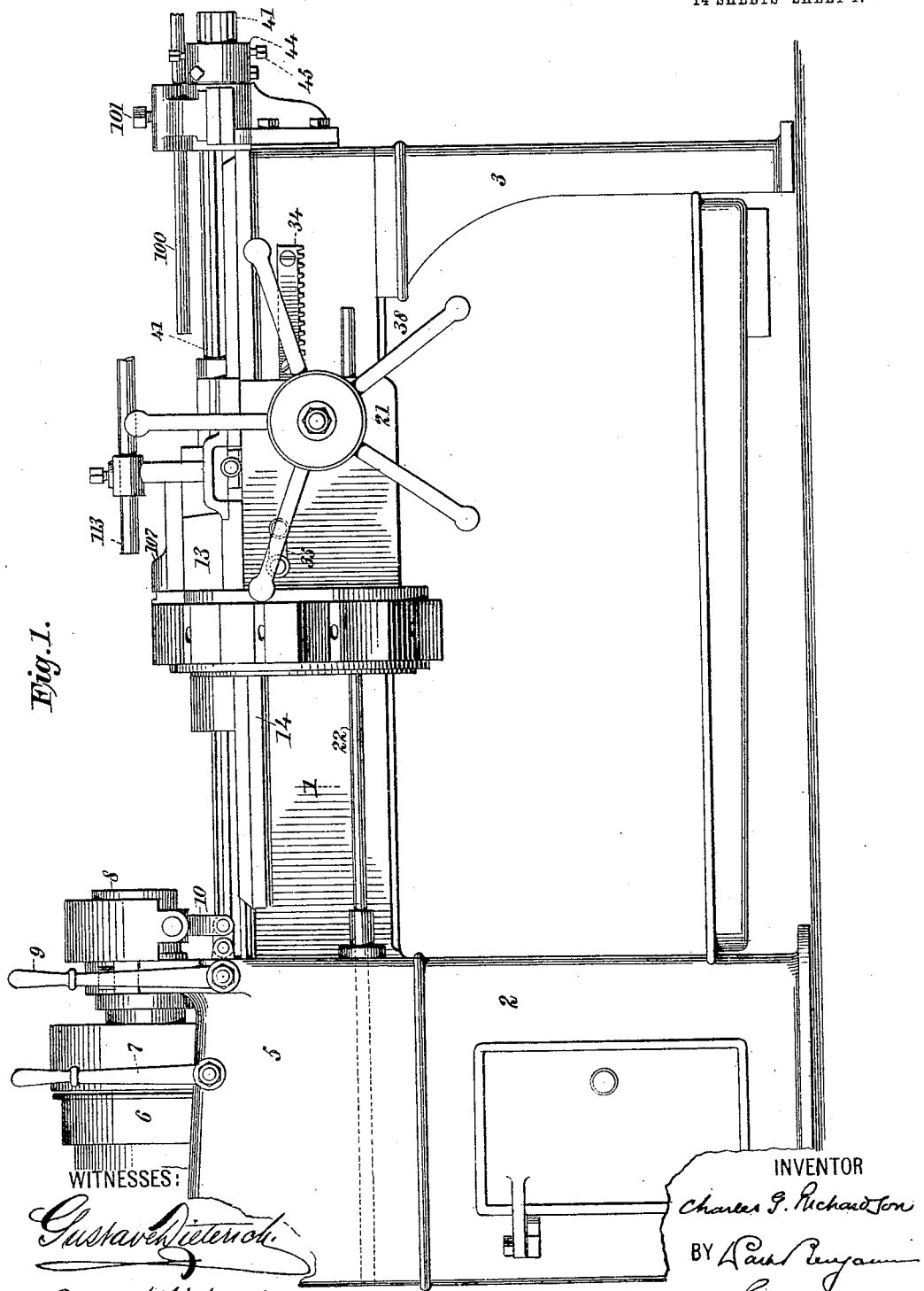
Figure 2:
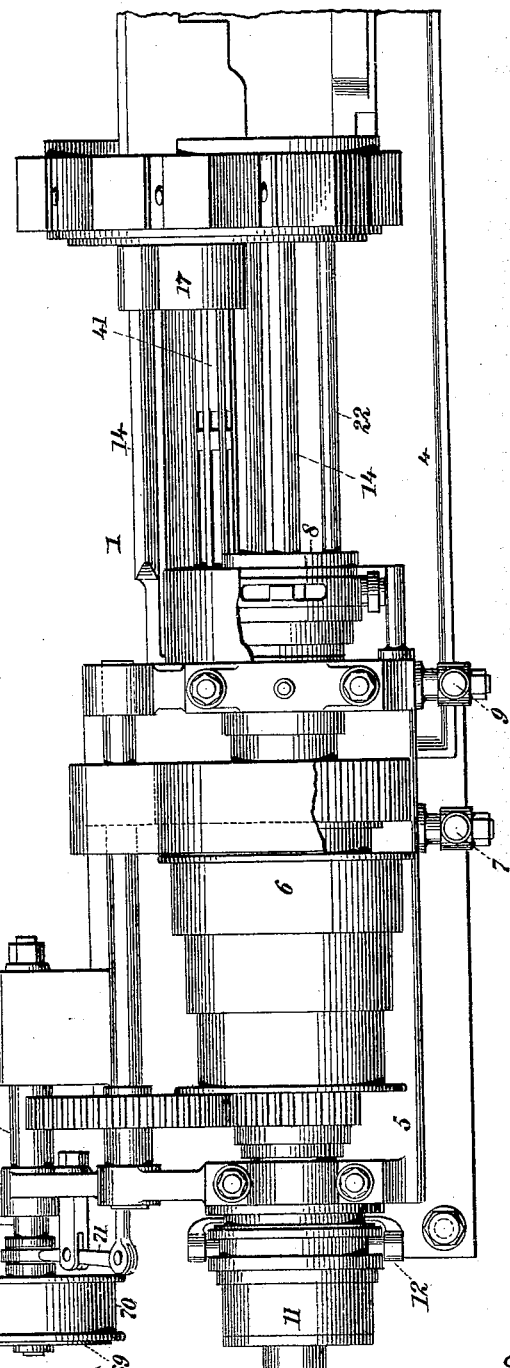
Figure 3:
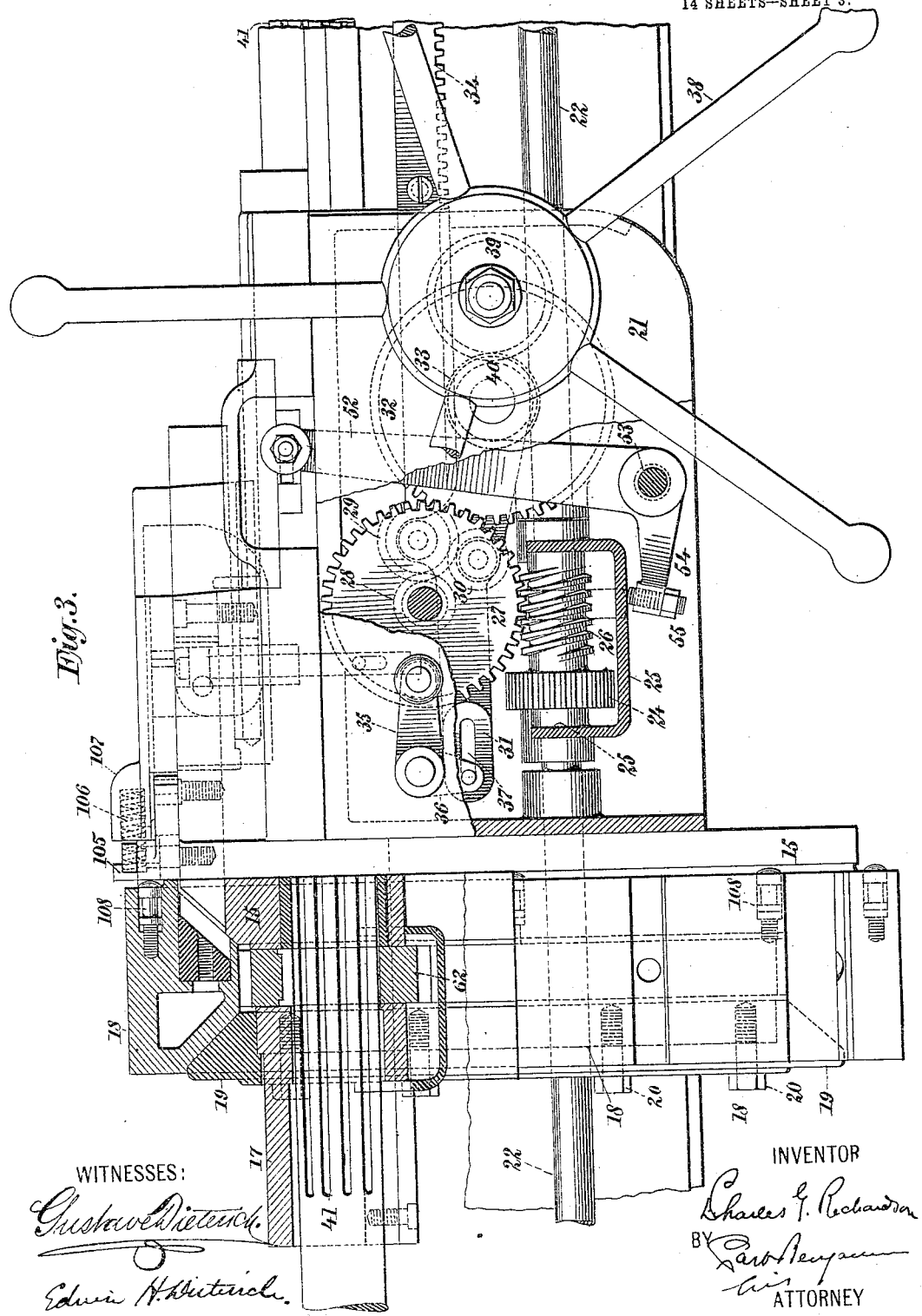
Figure 4:
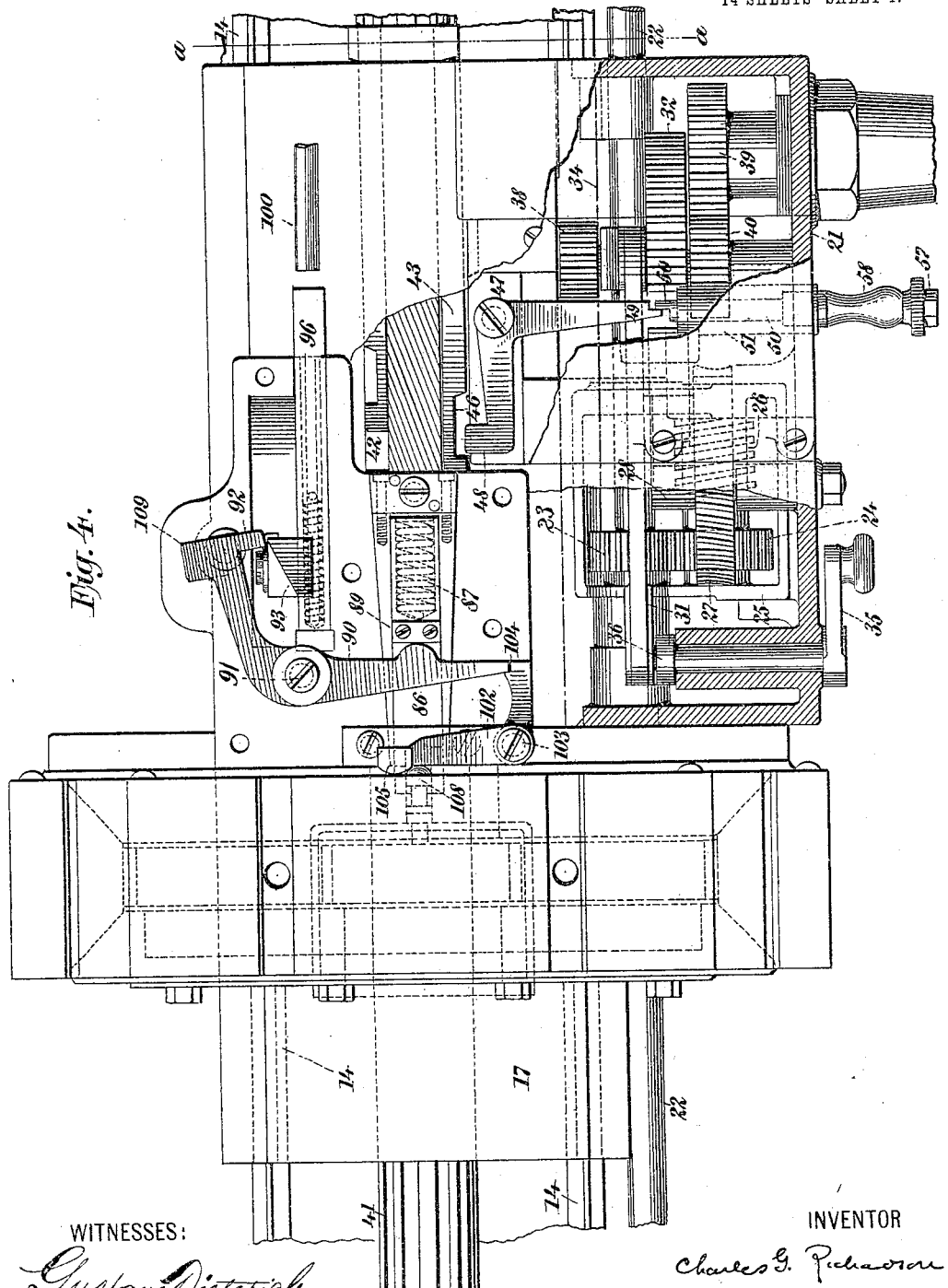

Figure 1 is a front elevation. Fig. 2 is a plan view. Fig. 3 is a partial front elevation of the apron, carriage, and turret with portions cut away to show internal construction. Fig. 4 is a plan view of the parts shown in Fig. 3, drawn on the same scale, with portions broken away to show internal construction. Fig. 5 is a transverse section across the bed on the line $a\ a$ of Fig. 4 with parts broken away to show internal construction. Fig. 6 is a longitudinal vertical section of the turret, carriage, and bed on the center line of the lathe, (line $x\ x$ of Fig. 7.) Fig. 7 is a section on the line $b\ b$ of Fig. 6, taken in the direction of the arrow $c$. Fig. 8 is a partial section of the upper part of the lathe, taken on the line $d\ d$ of Fig. 6 in the direction of the arrow $e$. Fig. 9 is a plan view of the turret-supporting carriage. Fig. 10 is a front elevation of the turret-supporting carriage on the same scale as shown in Fig. 9. Fig. 11 is an end view of the turret-supporting carriage looking from the head-stock and in the direction of the arrow $f$, Fig. 9. Fig. 12 is a similar view taken in the direction of the arrow $g$, Fig. 9. Fig. 13 is a rear elevation of the turret looking toward the head-stock. Fig. 14 is a section on the line $h\ h$ of Fig. 13, and Fig. 15 is a section on the line $i\ i$ of Fig. 13. Fig. 16 is an end view of the turret-lock-bolt bushing. Fig. 17 is a section on the line $j\ j$ of Fig. 16. Fig. 18 is a top view of the lock-bolt bushing when in the position shown in Fig. 16. Fig. 19 is a front elevation of the turret gib or follower ring. Fig. 20 is a side elevation of the same. Fig. 21 is a cross-section on the line $k\ k$ of Fig. 19. Fig. 22 is a plan view and partial section on the line $l\ l$ of Fig. 23 of the turret-revolving gear. Fig. 23 is a section on the line $m\ m$ of Fig. 22, taken in the direction of the arrow $n$. Fig. 24 is a partial section of the upper part of the carriage, showing in detail the turret-release mechanism. Fig. 25 is a longitudinal section on the line $o\ o$ of Fig. 24, taken in the direction of the arrow $p$. Fig. 26 is an end view, and Fig. 27 a front view, of the swinging stock-stop gage mounted on the carriage. Fig. 28 is a section of the power-feed release device.

Similar numbers of reference indicate like parts.

Referring first to Fig. 1, 1 represents the lathe-bed supported on the cabinet-standard 2 and legs 3. Beneath the bed 1 is the drip-pan 4. Integrally formed with the bed 1 is the head-stock 5, which carries a spindle and cone 6 and friction-gear mechanism in accordance with the usual practice in lathes of this kind. The friction-gear mechanism is controlled by the hand-lever 7. 8 is the chuck mechanism for grasping the stock and operated through the hand-lever 9 and link and toggle 10.

At 11, Fig. 2, is shown a roll-stock feed mechanism which is operated by the yoke 12. This yoke is controlled by mechanism not shown, but which may connect with the hand-lever 9.

As the particular costruction of the headstock mechanism forms no part of the present invention, it is not necessary to illustrate and describe the same. Attention is called to patents to myself, Nos. 481,717, 641,040, and 725,774, which show a clutch back gear, a rod-feed, and a chuck that may be employed; but it is to be understood that any desired kind of clutch back gear, rod-feed, and chuck may be employed.

The carriage 13, Figs. 6, 9, and 10, slides on ways 14 on the upper part of the lathe-bed and is held on the bed in the usual manner by fixed gibs 14*, which are secured to the carriage and which extend underneath said ways, as shown in Fig. 7. Cast integrally with the carriage 13 is the turret-supporting ring 15, Figs. 9 and 10, having a conical flange 16 and also provided with a curved projecting guard 17. The turret 18 (shown separately in Figs. 13, 14, and 15) is mounted upon the cone portion 16 of the ring 15, and therefore incloses said ring 15, and it is held in place by the conical follower-ring 19

(shown in Figs. 19, 20, and 21) and which is secured to it by bolts 20, as shown in Fig. 6. The turret in place upon its ring is best shown in Figs. 3, 4, 6, and 7.

*The carriage-moving mechanism.*—Depending downwardly from the carriage 13 is an apron 21, Fig. 3, inside of which is mounted the mechanism for moving the carriage on the bed. This mechanism I will now describe.

22 is a splined rod driven in the usual way, splined to slide upon which is the pinion 23, Fig. 5. Pinion 23 engages with pinion 24, Figs. 3 and 5, which pinion is supported on a drop-box 25. Integrally formed with the pinion 24 is the worm 26, which worm engages with the gear 27. On the shaft of gear 27 is a pinion 28, Figs. 3 and 4, which pinion engages with one or the other of the pinions 29 30, Fig. 3. These pinions are pivoted upon the reversing-lever 31. The pinion 29 engages with the gear 32. On the shaft of gear 32 is a pinion 33, which pinion engages with the rack 34, which is supported on the bed 1, as best shown in Fig. 5. It will thus be obvious that when the shaft 22 is rotated it communicates motion from the pinion 23 to the pinion 24, thence by worm 26 to gear 27 and pinion 28. Pinion 28 gears with the pinion 30 or the pinion 29 in accordance with the position in which the pivoted supporting-lever 31 may be set. If the pinion 28 engages with pinion 30, then obviously the pinion 29, actuated by pinion 30, turns the gear 32 in one direction, while if the pinion 28 engages directly with the pinion 29 and pinion 29 with gear 32 then gear 32 is rotated in the opposite direction, and inasmuch as pinion 33 on gear 32 engages with rack 34 it travels along said rack, moving with it the carriage 13 toward and from the head-stock of the lathe. In order to operate the reversing-lever 31, there is provided a handle 35, provided with an arm 36 and pin thereon engaging in the slot 37, Fig. 3, in the end of lever 31.

In order to actuate the carriage along the bed by hand, I provide a pilot-wheel 38, on the shaft of which is a pinion 39, which engages with the pinion 40, fast on the shaft of pinion 33, so that by rotating the pilot-wheel by means of the handle the pinion 39 turns the pinion 40, and the pinion 40, actuating the pinion 33, causes the carriage, as before, to travel along the rack 34. This hand operation may be effected under two conditions, in both of which, of course, the automatic feed-gear is thrown out. This may be done first by moving the handle 35 so as to bring both pinions 29 and 30 out of contact with pinion 28 and retaining said pinions in said position, or the feed-gear may be thrown out automatically in the following way and by the following means: 41, Fig. 6, is a shaft extending longitudinally the machine, having on its periphery a number of longitudinal recesses, as shown in section in Fig. 5. In each of these recesses is placed a rod, two of which rods are shown, respectively, at 42 and 43 in Fig. 4. These rods are held upon the shaft 41 by a clamp-collar 44, Fig. 1, provided with set-screws 45, one set-screw for each rod. By loosening the appropriate set-screw 45 any one of the several rods may be adjusted longitudinally in its recess upon the shaft 41. In each rod there is a notch, as shown at 46, Fig. 4, and the object of adjusting these rods longitudinally upon the shaft 41 is to place these notches in different positions longitudinally said shaft. The function of these notched rods is through the mechanism to be described to effect the automatic disengagement of the feed before alluded to and to cause this disengagement at proper times with respect to the several tools on the turret-head as these tools are successively brought into operation. This timing will be described farther on. For the present and in order to explain simply the operation of the feed-tripping mechanism I will refer to only one of these rods—namely, the rod 23. (Shown in Fig. 4.) It will be understood that every one of said rods as the shaft 41 rotates is brought successively into position for operation as 43 appears in Fig. 4, and therefore a description of the action of 43 in connection with the rest of the mechanism will apply to all. Pivoted to the carriage is a bell-crank lever 47, Fig. 4, one arm of which has a projection 48, which normally bears upon the outer edge of the rod 43. This bearing continues until by the movement of the carriage the projection 48 reaches the notch 46 in the rod 43, when the projection 48 is free to enter the notch 46, and so allowing the bell-crank lever 47 to tilt. At the end of the other arm of the bell-crank lever 47 is a latch-shoulder 49, Figs. 4 and 28, which engages with a similarly-formed end of the pin 50. This pin passes through a sleeve 51, Fig. 28, which is carried on the upper end of the vertical arm of the bell-crank lever 52, Figs. 3 and 5, which is pivoted at 53 on the apron. The other arm 54 of said lever 52 carries an adjustable screw-pin 55, which bears against the under side of the drop-box 25. The drop-box 25 is pivoted on the splined rod 22, Fig. 5. It will be seen, therefore, that the drop-box 25 is supported by the pin 55 on the bell-crank lever 52. If the bell-crank lever 52 is tilted so as to lower the pin 55, then the drop-box 25 will drop, swinging on the rod 22 as a pivot, and thus disengaging the worm 26 from the gear 27. The weight of the drop-box and associated parts therefore bears upon the pin 55, and by reason of this weight and also by reason of the normal tendency of the gear-teeth to disengage the pressure exerted on the arm 54 of the bell-crank lever 52 is sufficient to keep the shouldered end of the pin 50, Fig. 28, in contact with the shouldered end 49 of the bell-crank lever 47, and so to maintain the pressure of the projection 48 of that lever against the outer edge of the rod 43. It will thus be seen how the projection 48 of the bell-crank lever 47 is always ready to move into the notch 46 on the rod 43 as soon as that notch is reached. Now when notch 46 is reached and projection 48 on lever 47 goes into it the lever 47 becomes tilted sufficiently on its pivot to free the extremity 49 of said lever from the pin 50, and therefore the bell-crank lever 52 is free to tilt, so that the pin 55 descends and allows the box 25 to drop, thus removing the worm 26 from engagement with the gear 27, and so throwing the feed out of operation.

In order to effect by hand the engagement of the pin 50 with the bell-crank lever 47 when the projection 48 of lever 47 bears against the outer edge of the rod 43, the pin 50 is constructed to slide in the sleeve 51 (see Fig. 28) and is provided with a helical spring 56 and also with a knob 57. This knob is on the outside of the handle 58, which is secured to the sleeve 51, as best shown in section, Fig. 28. It will be obvious that by drawing outwardly on knob 57 the pin 50 is moved outwardly against the action of spring 56, and then by means of the handle 58 the sleeve 51, which works in an opening in apron 21, may be carried sufficiently far to the right of Fig. 3 to bring the shouldered end of pin 50 over the shouldered end 49 of the bell-crank lever 47, when by releasing the knob the pin 50 by the expansion of the spring is thrown forward and caused to engage over said shouldered end 49.

In order more effectively to insure the automatic disengagement of the pin 50 from the end 49 of the bell-crank lever 47, I provide on the carriage a slotted block 59, Fig. 28, against one side of which the end of pin 50 bears. This side has a cam incline 60, which the end of pin 50 meets and which operates to force that pin outwardly and out of engagement with the end 29 of the bell-crank lever 47.

I will now describe the mechanism for turning the turret upon its ring-support, so bringing the several tools which are secured upon the several sides of the turret into operative position successively.

Returning to the recessed shaft 41 and referring to Figs. 3 and 7, in the shaft 41 and between two of the recesses is formed a spline to receive a feather 61, which is fast on a pinion 62, which pinion is mounted on said shaft. Said pinion is therefore rotated by said shaft and is also free to slide over it. Pinion 62 engages with internal gear-teeth 63, formed on the inside of the turret 18, so that the revolution of said pinion 62 causes a rotation of the turret 18.

I will now describe how the rotation of the turret is controlled.

Referring to Figs. 22 and 23, supported on the rear side of the lathe is a bracket 64, Fig. 22, having a sleeve 65, which is also in one casting with the gear-box 66, which gear-box is bolted to the lathe. A sleeve 67 also extends in the opposite direction from the bracket 64. Passing through the bracket 64 and entering the gear-box 66 is a shaft 68. On the outer end of this shaft is attached a cone friction-disk 69, which is received in a friction belt-pulley 70. Pulley 70 rotates freely on shaft 68 and is provided with a grooved hub 68* and a pivoted shipping forked lever 71, engaging with said hub. The end of said lever 71 is linked to the longitudinally-sliding rod 72. This rod is provided with a helical spring 73, which normally tends to keep the friction-surfaces of 69 and 70 apart. When the rod 72 is moved longitudinally in the proper direction to bring the friction-surfaces of 69 and 70 together, then the movement of the belt-pulley being imparted to the friction-disk 69 the shaft 68 is thus set in rotation within the gear-box 66. On shaft 68 is a pinion 74, which engages with the gear 75, free to rotate on a stud within said gear-box. On the gear 75 is a disk 76, which is provided with three roller-pins 77 on its face. The pins 77 engage with the channels 78 in the Geneva gear 80, Fig. 23, fast upon the shaft 79, journaled inside the lathe. The Geneva gear 80 is toothed on its periphery to engage with the pinion 81, and pinion 81 is fast on stop-shaft 41. By reason of the well-known effect of the Geneva gear the shaft 41 thus becomes intermittently rotated. The object of the intermittent rotation of the shaft 41 is through the pinion 62 to effect the partial rotation of the turret to bring a tool into position and also to bring a stop-rod, as 43, into appropriate place to permit stoppage of the feed movement. Of course the mechanism so far described would cause continuous, although intermittent, rotary movement of the turret.

I will now describe the mechanism whereby the turret is brought to rest for proper intervals, so that the tool which comes into operation may do its work. This is done by locking the turret in position and also by disengaging the mechanism which rotates it, and these results are accomplished by the following devices: Referring to Figs. 13, 14, and 15, on the rear side of the turret are as many apertures 82 as the turret has sides. Thus, as shown, with an eight-sided turret there are eight openings 82. In each one of these apertures is placed a bushing 83, Figs. 16, 17, and 18. Each bushing is provided with a tapped hole 84, in which can be introduced a threaded tool for convenience in inserting and removing the bushing. In the bushing is a recess 85, and into this recess passes a locking-pin 86, whereby the turret is held and locked in definite position, as shown best in Fig. 6. The forward end of said pin is inclined to enter the recess 85, and at its rear portion it is hollowed out to receive a helical spring 87, which has a bearing against a fixed stop-block 88. The effect of the spring 87 is normally to throw the pin 86 into engagement in the recess 85, so that the pin will tend to lock the turret unless prevented. On the upper side of the locking-pin is fastened a block 89, against which bears a rounded projection on one arm of a bell-crank lever 90, Fig. 4, which is pivoted to the carriage at 91. The other arm of bell-crank lever 90 has an inwardly-turned projection 92, adapted to be met by a cam 93 on the upper end of block 94, Figs. 24 and 25, which is pivoted at 95 on one side of a sliding bar 96. Sliding bar 96 has a downwardly-projecting pin 97, (dotted lines, Fig. 25,) adapted to engage a helical spring 98 in a recess in the carriage. The action of the helical spring is to keep the bar outward or to the right of Fig. 4. The cam-block 94 is supported in upright position by means of a spring 99, which engages around its pivot and has a free end bearing on the offset in the lower part of the block, as shown in Fig. 25.

Fast on the back end of the lathe, Fig. 1, is a longitudinally-adjustable bar 100, held in position by set-screw 101. This bar is in line with the end of bar 96, as indicated in Fig. 4. When the carriage moves to the right of Fig. 4, the end of the sliding bar 96 strikes the end of the fixed rod 100, and as the carriage continues its movement the bar 96 becomes pushed to the left of Fig. 4, and the cam 93 forces the end 92 of the bell-crank lever 90 outward or in the position shown in Fig. 4, so that the other arm of said lever pushes the fixed block 89 on the locking-pin rearward, thus compressing the spring 87 and withdrawing the locking-pin from the turret, so that the parts will then be in the position shown in Figs. 3 and 4. The locking-bolt now being free from the turret, it is necessary to hold it back while the turret makes its partial revolution to bring a new tool into place. This is effected by the following means: On the upper side of the carriage and disposed in the same plane with the bell-crank lever 90 is another bell-crank lever 102, which is pivoted at 103, Fig. 4, and is provided at 104 with a latch-shoulder to engage with the extremity of the bell-crank lever 90, said shoulder being formed by a notch in the corner of one arm of the lever 102. The other arm of the bell-crank lever 102 carries a button end 105, which bears against a helical spring 106, Fig. 3. This spring is not shown in Fig. 4, because the cover 107, in which the spring is placed, is in that figure removed. The effect of the spring 106 is to set forward or to the left of Fig. 4 the rounded end 105 of the lever 102 to cause a locking of that lever with the bell-crank lever 90 at 104. In this way the lock-bolt 86 is withheld from the turret.

Around the turret on the rear side and located, preferably, at the angles and so placed as to meet the rounded faces of the end 105 of the lever 102 when the turret is rotated are a number of adjustable screws 108, each one of which has a protruding rounded head (see Fig. 3) forming a projecting stop. When a projecting screw 108 strikes the rounded end 105 of the bell-crank lever 102, it forces that end of the lever rearwardly, thus releasing the end of the bell-crank lever 90, and thus allowing the lock-bolt to be thrown forward by its spring 87, and so to engage with the turret, the turret then being in proper position for such engagement.

The object of pivoting the cam-block 94, Fig. 25, on the bar 96 is to allow the cam-block to tilt and pass under the inward projection 92 on the bell-crank lever 90 for resetting the parts.

On the bell-crank lever 90, Fig. 4, and extending in the opposite direction from the projection 92 is another projection 109, Fig. 24, the under side of which is beveled at 110 to form a cam-surface. This surface bears upon the upper end of a pin 111, disposed in a suitable opening in the carriage and provided with a helical spring 112, which normally tends to raise it and press it against the cam-surface 110. In Fig. 24 the pin 111 is shown depressed by the action of the cam-surface. When the pin 111 is thus depressed, it is brought in the path of the adjustable collar 82, Fig. 5, on shaft 72, so that the backward movement of the carriage engages this collar 82 and moves the shaft 72 in the direction of the arrow $r$ in Fig. 22, and so in the manner previously described causes engagement of the friction-surfaces of 69 and 70, and thus sets the turret into operation.

The headed screws 108 are so disposed on the turret that they can trip the bell-crank 102 at the time when the roller-pins 77, Fig. 23, are passing the tangential position in the Geneva gear 84, and at that instant a dwell occurs in the movement and the turret is at rest. The tripping of said lever 102 releases the bell-crank lever 90 and causes the lock-bolt 86 to be seated in the turret, and at the same time the action of the bell-crank lever 90 causes the cam-surface to pass away from the pin 111, whereupon the spring 112 on this pin causes said pin to be released from the collar 82 on the rod 72, and thereby releases the friction mechanism 69 70.

It will be apparent from the foregoing that the rotation of the turret by bringing a given headed screw 108 into contact with the end 105 of bell-crank lever 102 accomplishes two results: First, lever 90 is tripped, so that the spring 87 throws the locking-bolt 86 into its bushing in the turret, and so locks the turret in place; second, because of the tripping of lever 102 lever 90 is released and is swung to a position to permit the pin 111 to rise by the action of spring 112, thus raising the lower end of said pin clear of the collar 82 on rod 72 and leaving said rod free to be moved longitudinally by its spring 73 in a direction opposite that indicated by the arrow r, Fig. 22, and thus separating the friction-pulley 70 from the friction-disk 69. Shaft 41, which communicates movement to the turret through pinion 62, is thus disconnected from its source of power and its revolution ceases. The advantage of this second result is that it eliminates hand intervention of the operator, which requires constant watchfulness to exercise just at the proper instant and which if not precisely timely is apt to result in the turret bringing up with a hard jar, which is very detrimental to the machine. Furthermore, the use of the friction-gear is also important, because it furnishes means for gradual or elastic arrest of the turret, thus again avoiding the objectionable shock.

The operation of the machine as a whole is as follows: The lathe being properly belted and ready for work, the bar of stock is introduced into the spindle-hole, the roll-feed rolls in the usual way are brought to bear upon it and properly secured, and the various tools which are intended to act upon the stock are attached to the ring-turret in their order, beginning, if desired, with the stop-gage and ending with the cutting-off tool, all as described in my prior patent, No. 481,717. Instead of the stop-gage on the turret, however, I provide an adjustable stop 113, Figs. 1, 26, and 27, which is mounted in the swinging bar 114, supported on the carriage 13 and provided with a set-screw 115 for holding it in adjusted position. The feed adjustment for each tool is then set by bringing each rod 43 in the shaft 41 into proper position so that its notch 46 will cause the operation, already described, of the bell-crank lever 47 at the proper time and, as already described, to cause the dropping out of the feed. The drop-box 25 being normally down is lifted by means of its lever 52 and so to bring the worm-gear into engagement. It is of course to be understood that the rods 43 as fast as they are set are locked in position by means of their set-screws 45. The headed screws on the rear side of the turret of course determine whether the tool stationed immediately in front of each screw will be in operative position in line with the spindle or not, according as each screw is set out or in. It will therefore be understood that the adjustment of these screws outward or in operative position determine which tools are to be used. It will also be understood that the back-stop 100, which controls the drawing out of the locking-pin, is set so that the turret will unlock just as soon as the projecting tool has escaped the work. When this has been done, the collar 82 on the rod 72, which throws in the friction-gear which rotates the turret, should be set so that said friction-gears will engage and begin to rotate the turret as soon as the locking-pin 86, Fig. 6, has been thrown back. The chuck which holds the stock is now open, and the roller-feed operating in the usual way feeds forward the bar against the stop-gage 113, when the feed-roll, as usual, will slip, and then the roll-feed is thrown out and the chuck is closed. The attendant then moves the lever 52 to the right of Fig. 3, throwing in the power-feed tool, which is then in position and acts upon the work until its cut is completed, which is determined by the position of the notch 46 in the rod 43. After that is done the operator throws the carriage back by hand through the pilot-wheel until the locking-pin 86 is freed from the turret. The turret then rotates to its next operative position, bringing the second tool in place to act upon the work, when the pin is again thrown in and the locking mechanism out, the power-feed is put on, and this next tool begins its cut. This operation is repeated until all the several tools have acted and the finished piece is cut off, when the completed work drops into a pan below and the whole cycle is repeated.

The tools used on the turret can of course be any that may be desired, and for instances thereof reference is made to my prior patents, Nos. 481,717 and 725,775.

I claim—

1. In a lathe, a turret, a sliding carriage for the same, a mechanism for rotating the turret which comprises two members, one of which is movable to engage it with or disengage it from the other, a turret-locking device, a rod slidably mounted on the lathe and connected with said movable member, a pin carried by the sliding carriage, and movable into and out of the path of a part carried by the rod, and means movable in connection with the turret-locking device to actuate said pin.

2. In a lathe, a turret, a sliding carriage for the same, a mechanism for rotating the turret which comprises two members, one of which is movable to engage it with or disengage it from the other, a turret-locking device, a rod slidably mounted on the lathe and connected with said movable member, a pin carried by the sliding carriage, and movable into and out of the path of a part carried by the rod, and a lever that engages both the turret-locking device and said pin.

3. In a lathe, a turret, a sliding carriage for the same, a mechanism for rotating the turret which comprises two members, one of which is movable to engage it with or disengage it from the other, a turret-locking device, a rod slidably mounted on the lathe and connected with said movable member, a pin carried by the sliding carriage, and movable into and out of the path of a part carried by the rod, a lever coacting at one point with the turret-locking device and at another point with said pin, a latch for said lever, and a part on the turret to actuate said latch.

4. In a lathe, a turret, mechanism for rotating the same comprising coacting members that are temporarily inoperative one on the other at a certain point in the rotation of one of such members, and means for driving one of said members whereby it may impart motion to the other, a clutch for connecting and disconnecting said driving means with a source of motion, a turret-locking device, means for controlling the operation of the turret-locking device to lock the turret, and means for causing the unclutching of said driving means when said temporary inoperativeness of said rotating members occurs.

5. In a lathe, a turret, intermittently-acting gears for rotating the turret, means for driving one of said gears to transmit motion to the other, a friction-gear for driving the one of said gears that actuates its fellow, a turret-locking device, means for controlling the operation of the turret-locking device to lock the turret, and means for causing the separation of the parts of the friction-gear when said intermittently-acting gears become inactive.

6. In a lathe, a turret, a carriage therefor, intermittently-acting gears for revolving the turret that are temporarily disconnected at a certain point in the rotation of one of such gears, whereby movement of the turret therefrom ceases, means for driving one of said gears, a clutch for connecting and disconnecting said driving means and a source of power, a part on the carriage for operating said clutch in one direction, a turret-locking device and means to actuate the turret-locking device and means to actuate said clutch in the other direction when the cessation of the movement of the turret by said intermittently-acting gears occurs.

7. In a lathe, a turret, a friction-gear for rotating the same means controlled by said turret for separating the parts of said friction-gear when said turret shall have reached a predetermined position in its rotation, and a part on the turret to operate said means for separating the parts of the friction-gear.

8. In a lathe, a turret, a movable carriage therefor, feed mechanism for said carriage, a friction-gear for rotating said turret, a projection on said carriage constructed to be set by said turret when said turret shall have reached a predetermined position in its rotation a part on the turret to operate said projection and means for separating the parts of said friction-gear by the action of said projection set as aforesaid when the movement of said carriage by said feed mechanism shall bring said projection into operative relation to said separating means.

9. In a lathe, a carriage, an annular tool carrying turret supported on said carriage and surrounding the lathe-bed, friction-gearing for intermittently rotating said turret means controlled by said turret for separating said friction-gearing after each intermittent partial rotation of said turret, and a part on the turret to operate said separating means.

10. In a lathe, a carriage, a turret supported on said carriage, mechanism for rotating the turret intermittently, a locking device movable into and out of engagement with the turret, a slide, a relatively stationary part for actuating said slide, means acted upon by said slide to move the locking device out of engagement with the turret, and means for starting the turret-rotating mechanism also actuated by said slide.

11. In a lathe, a turret, a movable carriage therefor, means for rotating the turret, means for controlling the movement of the turret-rotating means, a part movably mounted on the carriage so that it may be moved into and out of coöperation with said arresting means and a part relative to which the carriage moves to actuate said movable part to change its position relative to said controlling means.

12. In a lathe, a carriage, a turret supported on said carriage, an in and out adjustable projection on the rear side of said turret, a bell-crank lever 102 pivoted on said carriage and adapted to be tilted by said projection, a bell-crank lever 90 pivoted on said carriage and engaging with said lever 102, a vertically-moving pin 111 in said carriage controlled by said lever 102 in combination with mechanism for intermittently rotating said turret and means for arresting said mechanism controlled by said pin 111.

13. In a lathe, a carriage, a turret supported on said carriage, and an in and out adjustable projection on the rear side of said turret, a bell-crank lever 102 pivoted on said carriage and adapted to be tilted by said projection, a bell-crank lever 90 pivoted on said carriage and engaging with said lever 102, a vertically-moving pin 111 on said carriage controlled by said lever 102, in combination with a longitudinally-movable rod 72 supported on said lathe and provided with a collar 82 adapted to be engaged by said pin 111, a friction-gear 69, 70 controlled by said rod and gearing for intermittently transmitting rotary movement from said friction-gear to said turret.

14. In a lathe, a carriage, a turret supported thereon, an actuating-shaft 41 for said turret in combination with the friction-gears 69, 70, means for rotating gear 70, intermediate gearing including a Geneva pinion 80 interposed between said gear 69 and shaft 41, and means controlled by said carriage for separating said friction-gears; the said means being timed to operate during temporary stoppage of rotary movement of said turret due to said Geneva pinion.

15. In a lathe, a turret, a carriage for the turret, a shaft whose axis lies parallel with the direction of the travel of the carriage, gearing between said shaft and the turret to transmit power from the shaft to the turret to revolve the turret, feed mechanism for the carriage, a part mounted on and moving with the carriage for controlling the operation of the feed mechanism, and means mounted on the shaft to coact with said part on the carriage.

16. In a lathe, a turret, a carriage for the turret, a shaft extending longitudinally of the lathe, gearing between the shaft and the turret, feed mechanism for the carriage comprising two gears, one of which is movable into and out of engagement with the other, means for holding the movable gear in mesh with the other, a lever mounted on the carriage for latching said holding means, and parts carried by said shaft which coact with said lever.

17. In a lathe, a turret, a shaft for rotating said turret, over which the turret is slidable, a stop device or devices carried by said shaft and not projecting beyond the surface thereof, and mechanism actuated by said stop device, or devices.

18. In a lathe, a turret, a shaft for rotating said turret, the turret being slidable over the shaft, and a series of stop-rods contained in grooves in said shaft, and mechanism that is controlled by said stop-rods.

19. In a lathe, a turret, a shaft for rotating said turret passing through the same with its axis parallel to the turret-axis, a carriage on which the turret is mounted that is slidable lengthwise on said shaft, stop-rods contained in grooves in said shaft, and feed mechanism for the carriage controlled by said stop-rods.

20. In a lathe, the combination of a carriage, a turret having gear-teeth, a shaft over which the turret is slidable, adjustable notched rods in grooves in said shaft, a pinion on said shaft meshing with the turret gear-teeth, mechanism actuated by the turret for controlling the rotation of said shaft, a lever pivoted on the carriage, having an arm adapted to coöperate with each of the notched rods, a feed mechanism for the carriage, and mechanism controlled by said lever for arresting the movement of the carriage-feed mechanism.

21. In a lathe the combination of a carriage, an annular tool-carrying turret having internal gear-teeth and supported on said carriage and surrounding the lathe-bed, an intermittently-rotary shaft 41 having longitudinal recesses, adjustable notched rods 43 in said recess, pinion 62 on said shaft engaging with said turret gear-teeth, mechanism actuated by said turret for controlling said intermittent rotation of said shaft 41, bell-crank lever 47 pivoted on said carriage having one arm bearing against said rod 43 and adapted to enter the notch in said rod, a feed mechanism for said carriage, and mechanism controlled by the other arm of lever 47 for arresting the movement of said carriage-feed mechanism.

22. In a lathe, a carriage, a turret thereon, a shaft having longitudinal grooves corresponding in number to the number of tools carried by the turret, over which the turret is slidable, means for intermittently rotating said shaft and imparting said rotation to the turret, a stop-rod in each of said grooves, a lever pivoted to the carriage having an arm to coöperate with each of said rods, a feed mechanism for moving the carriage and means governed by said lever for arresting the motion of said feed mechanism.

23. In a lathe, a carriage, a polygonal annular turret adapted to carry tools on its sides and supported on said carriage and surrounding the lathe-bed, a shaft having longitudinal recesses corresponding in number to the sides of said turret, means for intermittently rotating said shaft and imparting said rotation to said turret, notched rods corresponding in number to the tool-carrying sides of said turret disposed in said recesses and longitudinally adjustable therein, a bell-crank lever pivoted on said carriage and having one arm adapted to bear upon one of said rods and to enter the notch therein, a feed mechanism for moving said carriage and means governed by said lever for arresting the motion of said feed mechanism during the dwell in the rotation of said shaft.

24. In a lathe, a carriage, an annular tool-carrying turret supported on said carriage and surrounding the lathe-bed, a longitudinally-recessed shaft, means for rotating said shaft and for imparting said rotation to said turret, a notched rod disposed in a shaft-recess and longitudinally adjustable therein, a bell-crank lever pivoted on said carriage having one arm adapted to bear upon said rod and enter the notch therein, mechanism for moving said carriage and means governed by said lever for arresting the motion of said feed mechanism.

25. In a lathe, a stock or rod carrying chuck, a carriage, a turret on the carriage, and a stock stop or gage on the carriage, apart from the turret, and situated so that the turret-tools are between the work and said stock-stop when said stock-stop is being used.

26. In a lathe, a stock or rod carrying chuck, a carriage, a turret on the carriage, adjustable feed-stops to the tools, a stock stop or gage on the carriage, the longitudinal operative position of said stock stop or gage together with the adjustment of one of the tools being determined by the setting of the feed-stop to said tool, the location of said tool being between the work and stock-stop when said stock-stop is being used, said stock stop or gage being situated so that it is in operative position when the carriage ceases its movement by the action of the one of said feed-stops with reference to which the longitudinal operative position of the stock stop or gage is determined.

27. In a lathe, a stock or rod carrying chuck, a carriage, a turret on the carriage having its axis parallel with the direction of travel of the carriage toward and from the chuck, feed-stops to the turret-tools and a stock stop or gage on the carriage apart from the turret, and situated thereon, so that the turret-tool is between the work and the stock-stop, when said stock-stop is being used.

In testimony whereof I have signed my name to this specification in the presence of two subscribing witnesses.

CHARLES G. RICHARDSON.

Witnesses:
C. E. RICHARDSON,
N. W. ANDREWS.